United States Patent [19]
Chadha et al.

[11] Patent Number: 6,134,555
[45] Date of Patent: *Oct. 17, 2000

[54] DIMENSION REDUCTION USING ASSOCIATION RULES FOR DATA MINING APPLICATION

[75] Inventors: Atul Chadha, Milpitas; Balakrishna Raghavendra Iyer, San Jose, both of Calif.; Hammou Messatfa, Paris, France; Jeonghee Yi, San Jose, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/020,438

[22] Filed: Feb. 9, 1998

Related U.S. Application Data

[60] Provisional application No. 60/039,538, Mar. 10, 1997.
[51] Int. Cl.[7] ....................................... G06F 17/30
[52] U.S. Cl. ................................... 707/102; 6/2
[58] Field of Search ..................... 707/102, 2, 6

[56] References Cited

U.S. PATENT DOCUMENTS

| | | | |
|---|---|---|---|
| 5,615,341 | 3/1997 | Agrawal et al. | 395/210 |
| 5,675,819 | 10/1997 | Schuetze | 395/760 |
| 5,724,573 | 3/1998 | Agrawal et al. | 395/606 |
| 5,819,258 | 10/1998 | Vaithyanathan et al. | 707/2 |
| 5,857,179 | 1/1999 | Vaithyanathan et al. | 707/2 |
| 6,026,397 | 2/2000 | Sheppard | 707/5 |

OTHER PUBLICATIONS

R. Agrawal, et al., "Fast Discovery of Association Rules", Advances in Knowledge Discovery and Data Mining, Chapter 12, pp. 307–328, 1995.

R. Agrawal, et al., "An Interval Classifier For Database Mining Applications", VLDB, pp. 560–573, Aug. 23–27, 1992.

J.H. Friedman, et al., "A Projection Pursuit Algorithm for Exploratory Data Analysis", IEEE Transactions on Computers, vol. C–23, No. 9, pp. 881–890, Sep. 1974.

M.C. Jones, et al., "What is Projection Pursuit?", J. R. Statis. Soc., Series A, vol. 150, Part 1, pp. 1–38, 1987.

M. Houtsma, et al., "Set–Oriented Mining For Association Rules In Relational Databases", Proceedings of the Eleventh International Conference on Data Engineering, pp. 25–33, Mar. 6–10, 1995.

Primary Examiner—Wayne Amsbury
Attorney, Agent, or Firm—Pretty, Schroeder & Poplawski, P.C.

[57] ABSTRACT

A method, apparatus, and article of manufacture for a computer-implemented random reliability engine for computer-implemented association rule reduction using association rules for data mining application. The data mining is performed by the computer to retrieve data from a data store stored on a data storage device coupled to the computer. The data store has records that have multiple attributes. Attribute value associations are determined between attributes and their values. Attribute associations are determined from the determined attribute value associations. Attributes are selected based on the determined attribute associations for performing data mining.

18 Claims, 4 Drawing Sheets

DIMENSION REDUCTION USING ASSOCIATION RULES FOR DATA MINING APPLICATION

PROVISIONAL APPLICATION

This application claims the benefit of U.S. Provisional Application No. 60/039,538, entitled "DIMENSION REDUCTION USING ASSOCIATION RULES FOR DATA MINING APPLICATION," filed on Mar. 10, 1997, by Atul Chadha et al., which is incorporated by reference herein.

CROSS-REFERENCE TO RELATED APPLICATION

This application is related to the following copending and commonly-assigned patent application:

Application Ser. No. 09/021,038 entitled "DIMENSION REDUCTION FOR DATA MINING APPLICATION," filed on same date herewith, by Atul Chadha, et al., now U.S. Pat. No. 6,032,146 which is incorporated by reference herein.

BACKGROUND OF THE INVENTION

1. Field of the Invention

This invention relates in general to computer implemented data mining, and in particular to dimension reduction using association rules for data mining application.

2. Description of Related Art

Data mining is the process of finding interesting patterns in data. Data mining often involves datasets with a large number of attributes. Many of the attributes in most real world data are redundant and/or simply irrelevant to the purposes of discovering interesting patterns.

Dimension reduction selects relevant attributes in the dataset prior to performing data mining. This is important for the accuracy of further analysis as well as for performance. Because the redundant and irrelevant attributes could mislead the analysis, including all of the attributes in the data mining procedures not only increases the complexity of the analysis, but also degrades the accuracy of the result. For instance, clustering techniques, which partition entities into groups with a maximum level of homogeneity within a cluster, may produce inaccurate results. In particular, because the clusters might not be strong when the population is spread over the irrelevant dimensions, the clustering techniques may produce results with data in a higher dimensional space including irrelevant attributes. Dimension reduction improves the performance of data mining techniques by reducing dimensions so that data mining procedures process data with a reduced number of attributes. With dimension reduction, improvement in orders of magnitude is possible.

The conventional dimension reduction techniques are not easily applied to data mining applications directly (i.e., in a manner that enables automatic reduction) because they often require a priori domain knowledge and/or arcane analysis methodologies that are not well understood by end users. Typically, it is necessary to incur the expense of a domain expert with knowledge of the data in a database who determines which attributes are important for data mining. Moreover, conventional dimension reduction techniques are not designed for processing the large datasets that data mining processes.

Some statistical analysis techniques, such as correlation tests, have been applied for dimension reduction. However, these are ad hoc and assume a priori knowledge of the dataset which can not be assumed to always be available.

Some automatic procedures have been proposed for dimension reduction for exploratory analysis of multivariate datasets. The Principal Components Analysis technique reduces dimensions based on the proportion of total variance of each attribute. Attributes with higher proportion of total variance are selected as principal components. Projection pursuit, one technique of automatic selection, was proposed in J. H. Friedman and J. W. Tukey, *A Projection Pursuit Algorithm for Exploratory Data Analysis*, IEEE Transactions on Computers, 1974, Vol. 23, pp. 881–889, which is incorporated by reference herein. Projection pursuit reveals structure in the original data by offering selected low-dimensional orthogonal projections of the data for inspection. Projection pursuit makes automatic selections by the local optimization over projection directions of an index of interestingness.

However, these techniques are not practically applicable for data mining problems that deal with very large datasets, commonly with millions to billions of records and a large number of attributes. Instead, these techniques are mainly designed for small datasets of hundreds to thousands of records, typically having fewer than ten attributes.

Some recent work in data mining research was designed for the discovery of association rules for large datasets. A rule is a grouping of attribute value pairs. Houtsma and Swami developed a set-oriented association rule discovery technique SETM, which is described in M. Houtsma and A. Swami, *Set-Oriented Mining for Association Rules in Relational Databases*, Research Report RJ 9567, October 1993, IBM Almaden Research Center, [hereinafter "Houtsma and Swami"], which is incorporated by reference herein. Houtsma and Swami showed that association can be carried out by a general relational query language, such as SQL. The set-oriented nature of SETM simplifies the technique and facilitates extensions such as parallelization.

The Apriori and AprioriTid techniques are described in R. Agrawal, H. Mannila, R. Srikant, H. Toivonen, and Verkamo A. I., *Fast Discovery of Association Rules*, Advances in Knowledge Discovery and Data Mining, Chap. 12, AAAI/MIT Press, 1995, which is incorporated by reference herein. Apriori and AprioriTid offer improved performance by reducing the number of association rules generated in each pass with small support. Moreover, AprioriTid makes use of the rules generated in the previous pass instead of accessing the whole database again for the next pass.

There is a need in the art for improved dimension reduction using association rules for use in data mining with large datasets.

SUMMARY OF THE INVENTION

To overcome the limitations in the prior art described above, and to overcome other limitations that will become apparent upon reading and understanding the present specification, the present invention discloses a method, apparatus, and article of manufacture for computer-implemented association rule reduction for data mining application.

In accordance with the present invention, the data mining is performed by the computer to retrieve data from a data store stored on a data storage device coupled to the computer. The data store has records that have multiple attributes. Attribute value associations are determined between attributes and their values. Attribute associations are determined from the determined attribute value associations. Attributes are selected based on the determined attribute associations for performing data mining.

One object of the present invention is to provide entirely computer-implemented dimension reduction for data mining using association rules without the need for a domain expert. Another object of the present invention is to determine important and relevant attributes for data mining.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
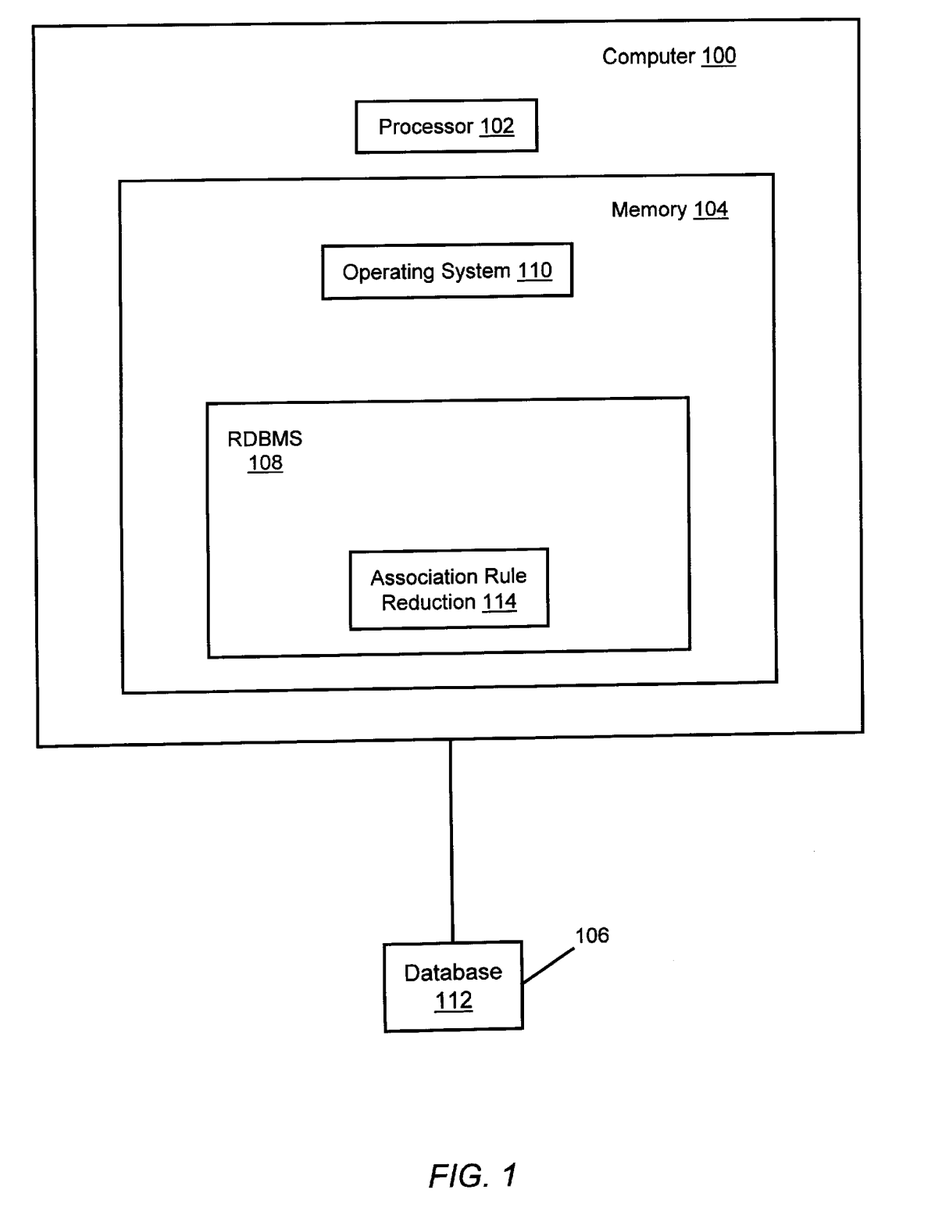
FIG. 1 is a block diagram illustrating an exemplary hardware environment, including software elements, used to implement the preferred embodiment of the invention.

FIG. 1 is a block diagram illustrating an exemplary hardware environment, including software elements, used to implement the preferred embodiment of the invention. In the exemplary hardware environment, a computer 100 is comprised of one or more processors 102, random access memory (RAM) 104, and assorted peripheral devices. The peripheral devices usually include one or more fixed and/or removable data storage devices 106, such as a hard disk, floppy disk, CD-ROM, tape, etc. Those skilled in the art will recognize that any combination of the above components, or any number of different components, peripherals, and other devices, may be used with the computer 100.

The present invention is typically implemented using relational database management system (RDBMS) software 108, such as the DB2® product sold by IBM Corporation, although it may be implemented with any database management system (DBMS) software. The RDBMS software 108 executes under the control of an operating system 110, such MVS®, AIX®, OS/2®, WINDOWS NT®, WINDOWS®, UNIX®, etc. Those skilled in the art will recognize that any combination of the above software, or any number of different software applications may be used to implement the present invention. Additionally, the present invention can be implemented with any data store rather than a relational database.

The RDBMS software 108 receives commands from users for performing various search and retrieval functions, termed queries, against one or more databases 112 stored in the data storage devices 106. In the preferred embodiment, these queries conform to the Structured Query Language (SQL) standard, although other types of queries could also be used without departing from the scope of the invention. The queries invoke functions performed by the RDBMS software 108, such as definition, access control, interpretation, compilation, database retrieval, and update of user and system data. Additionally, the RDBMS software 108 includes association rule reduction software 114 for optimizing data mining.

The RDBMS software 108, the SQL queries, and the instructions derived therefrom, may be tangibly embodied in or readable from a computer-readable medium, e.g. one or more of the data storage devices 106 and/or data communications devices coupled to the computer. Moreover, the RDBMS software 108, the SQL queries, and the instructions derived therefrom, are all comprised of instructions which, when read and executed by the computer 100, cause the computer 100 to perform the steps necessary to implement and/or use the present invention.

Association Rule Reduction

A database 112 is a set of records that are described by a set of attributes which have values. Each record is a point in multi-dimensional space, each dimension corresponding to an attribute of the database 112. Association rules are derived from and used to represent frequently occurring patterns within the database 112. Clustering is a data mining technique used to order records into subsets, where records in each subset are very similar to each other in a predefined manner.

Data mining retrieves interesting data from a very large database 112, such as a database describing existing, past, or potential clients that may have thousands of attributes. Conventional data mining techniques do not work well on a database with a large number of attributes. Moreover, some of the attributes are not relevant to the retrieved information. For example, when analyzing buying patterns of consumers, an attribute providing the date on which customer information was first entered into the database may not be relevant. Dimension reduction is the process of removing the irrelevant attributes prior to performing data mining.

Figure 2:
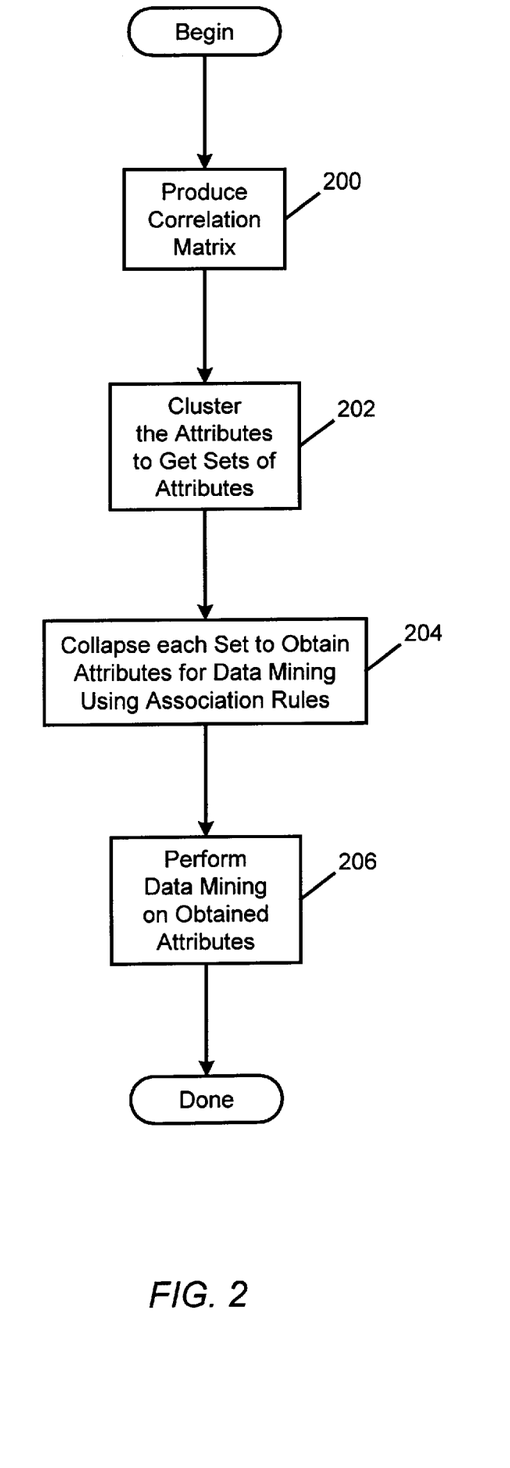
FIG. 2 is a flow diagram illustrating the steps that are performed for dimension reduction using association rules.

FIG. 2 is a flow diagram illustrating the steps that are performed for dimension reduction using association rules. Block 200 represents the association rule reduction software 114 producing a correlation matrix, consisting of correlations between each pair of attributes from an original table. The input data from the original table consists of "n" attributes, of which "p" are categorical attributes and "m" are continuous attributes. Categorical attributes take values from a domain of labels or names. For example, an attribute that describes the ethnicity of a consumer is a categorical attribute. Continuous attributes take values from a numerical domain. For example, an attribute that describes the average monthly balance of a consumer is a continuous attribute.

The association rule reduction software 114 constructs an "n" by "n" matrix COR consisting of correlation measures between each pair of attributes. The "p" attributes ($V_0 \ldots V_{p-1}$) are categorical and are arranged from columns "0" through "p-1" and rows "0" through "p-1". The "m" attributes ($W_p \ldots W_{n-1}$) are continuous attributes and are arranged from columns "p" through "n-1" and rows "p" through "n-1".

$$COR = \begin{matrix} \\ v \\ w \end{matrix} \begin{matrix} v & w \\ \begin{bmatrix} a_{ij} & b_{ij} \\ c_{ij} & d_{ij} \end{bmatrix} \end{matrix}$$

One correlation matrix is shown above, however the "p" categorical attributes and the "m" continuous attributes may be related by different correlations, which produce different correlation matrices. The values $a_{ij}$ in the correlation matrix shown above are association measures between the "p" categorical attributes $V_i$ and $V_j$. For example, a person skilled in the art of association rules used for data mining will appreciate that the association measures can be Chi-square, entropy, etc. The values $b_{ij}$ are a correlation measure between the "p" categorical attributes and the "m" continuous attributes $V_i$ and $W_j$. The values $c_{ij}$ are a correlation measure between the continuous and the categorical attributes $W_i$ and $V_j$. The values $d_{ij}$ are association measures between the "m" continuous attributes $W_i$ and $W_j$. The values $a_{ij}$, $b_{ij}$, $c_{ij}$, and $d_{ij}$ are then normalized to be between "0" and "1".

Block 202 represents the association rule reduction software 114 clustering the attributes in the original table to get sets of attributes (i.e., smaller tables). The "n" rows of the matrix produced are clustered. The number of clusters can be fixed (e.g., "d" clusters) based on how many dimensions are required after the dimension reduction is performed. By clustering the rows, all attributes that have similar correlations with other attributes are grouped into one set of attributes. This forms "d" non-intersecting sets of attributes, each consisting of some subset of all the attributes from the original table.

Block 204 represents the association rule reduction software 114 collapsing each set of attributes into one or two attributes to be used for data mining using association rules. The "d" sets of attributes are collapsed to "d" (or a small multiple of "d") attributes (i.e., dimensions). Block 206 represents the RDBMS software 108 performing the data mining using the obtained attributes (i.e., reduced dimensions).

Figure 3:
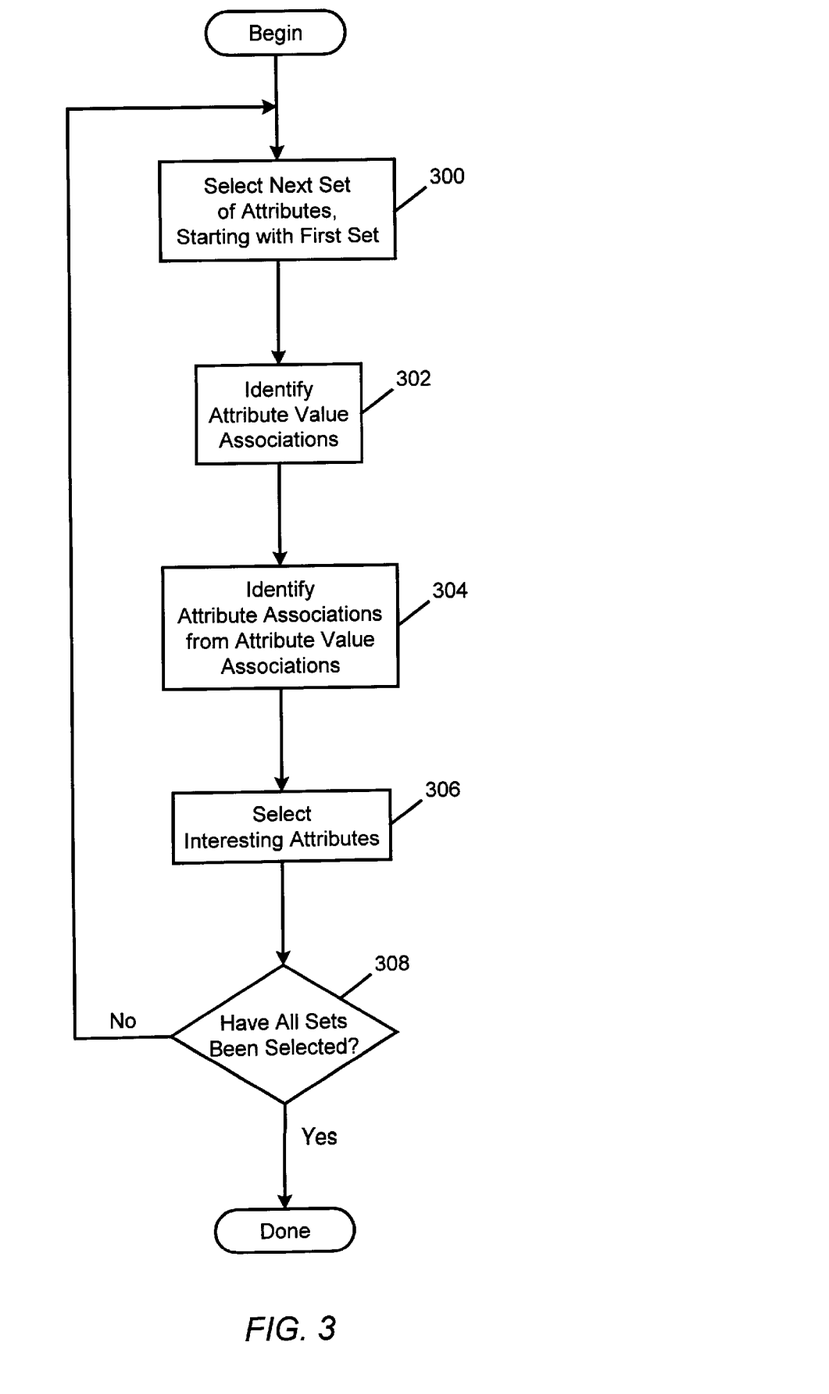
FIG. 3 is a flow diagram illustrating the steps the association rule reduction software performs to collapse the "d" sets of attributes into "d" attributes using association rules.

FIG. 3 is a flow diagram illustrating the steps the association rule reduction software 114 performs to collapse the "d" sets of attributes into "d" attributes using association rules. Association rules are used to distinguish interesting attributes from irrelevant attributes. The association rule reduction software 114 measures the importance of each attribute based on association rules and their support. Support of a rule is a measure of frequency of the rule, which is defined as the ratio of transactions supporting the rule to the total number of transactions in the database 112, where a transaction is a collection of attribute-value pairs. For example, for attribute value pairs attribute2-value2 and attribute5-value5, if these attribute value pairs occurred five percent of the time in the database, then support of the rule is said to be five percent.

The conventional association techniques, such as SETM, Apriori and AprioriTid, discover attribute value associations, not attribute associations. In other words, the association rules found by these conventional techniques are patterns of attribute values, rather than patterns of attributes. The association rule reduction software 114 obtains attribute associations to select interesting attributes. The selection and use of interesting attributes reduces the dimension of attributes (not attribute values). The association rule reduction software 114 automatically obtains attribute associations from the attribute value associations.

Block 300 represents the association rule reduction software 114 selecting a next set of attributes, starting with the first set of attributes. Block 302 represents the association rule reduction software 114 identifying attribute value associations. Attribute value associations are identified using conventional techniques. Initially, the value of an attribute is associated with the attribute. After this, each row has "n" attribute value pairs. Next, the association rule reduction software 114 determines the number of times different attribute value pairs occur. When the same attribute value pairs often occur together in the same row of the database 112 for many records, those attribute value pairs are associated. For example, if many different rows in the database had the attribute value pairs of attribute credit-rating with a value of excellent and attribute state with a value of California, these attribute value pairs would be associated with each other.

Block 304 represents the association rule reduction software 114 identifying attribute associations from the attribute value associations. Once attribute value associations are identified, the association rule reduction software 114 determines the strength of the associations based on how often those associations occur together in rows of the database 112. Then, the attributes having the strong associations are selected for data mining. That is, to obtain attribute associations from the attribute value associations, the association rule reduction software 114 integrates attribute value associations over the value of the attributes. Only attribute value association rules with high support are included to produce attribute associations by integrating support of the rules for each attribute in the descending order of support. The cumulative support of each attribute is a measure of the importance of each attribute.

Block 306 represents the association rule reduction software 114 selecting at least one interesting attribute. In particular, the association rule reduction software 114 takes the attribute value association rule with the highest support and adds support of the rule to each attribute associated in the rule. The association rule reduction software 114 continues the summation until the association rule reduction software 114 reaches a cut-off point. The cut-off point can be preset to the number of dimensions desired for each set of attributes for data mining. Then, the attributes with positive cumulative support count are selected as interesting attributes. Next, the attribute association that contains the interesting attributes is selected.

Block 308 represents the association rule reduction software 114 determining whether all sets of attributes have been selected. When all of the sets of attributes have been selected, the selected attributes are used for data mining. When all of the sets of attributes have not been selected, the association rule reduction software 114 loops back to Block 300 to process the next set of attributes.

Figure 4:
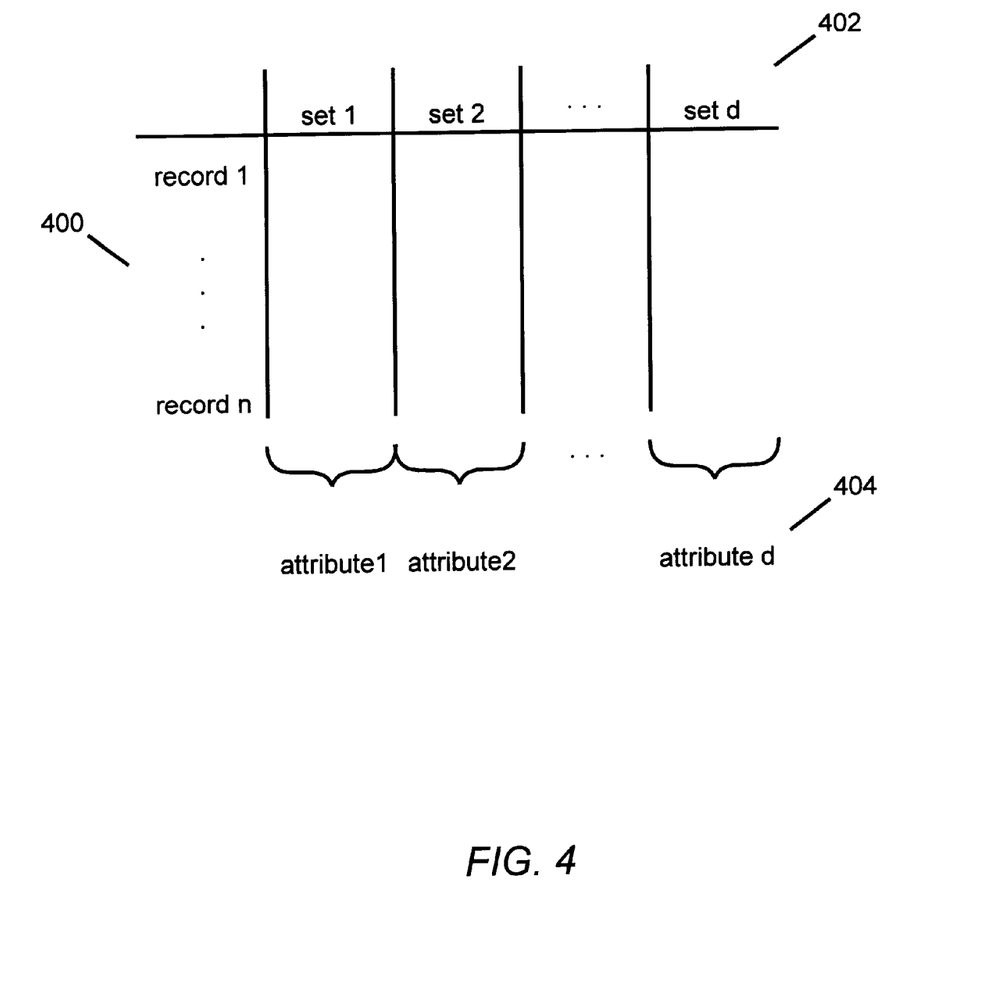
FIG. 4 is a table illustrating the outcome of the association rule reduction software performing dimension reduction using association rules.

FIG. 4 is a table illustrating the outcome of the association rule reduction software 114 performing dimension reduction using association rules. For each of the "d" sets of attributes 402 determined in Block 202, the association rule reduction software 114 uses association rules to distinguish interesting attributes from irrelevant attributes. In particular, for the "d" sets of attributes 402, the association rule reduction software 114 selects "d" attributes 404 for use in data mining.

In one embodiment of the present invention, binary association rules are used to calculate the importance measure of each attribute. The cut-off point is set to be the top 0.1% of the total number of binary rules. The total number of binary rules is "n" by "m" by "m−1", where "n" is the number of records in the database 112, and "m" is the number of attributes in the database 112. In this embodiment, dimension reduction is implemented in set-oriented fashion and includes the attribute value association adopted from Houtsma and Swami.

The following is pseudocode for the association rule reduction software 114:

```
Value_Association = association_rules(database):
for(each attribute, i, in the database)
    begin
        cum_support[i] = 0;
    end;
while (true)
    begin
        NextRule = next_rule(Value_Association);
        for(each attribute, i, in NextRule)
            begin
                cum_support[i] += support of the rule;
            end;
        tot_support=0;
        for(each attribute, i, in the database)
            begin
                tot_support += cum_support[i];
            end;
        if (tot_support>cut_off)
            begin
                Att_Association = {i|cum_support[i]>0};
                return(Att_Association);
            end;
    end;/*while*/
```

The association_rules function finds all of the attribute value association rules from a given database 112. The next_rule function returns an association rule with the next highest support and removes the association rule from the pool of attribute value association rules.

In another embodiment, the present invention is combined with clustering. Details about clustering are described in A. K. Jain, and R. C. Dubes, *Algorithms for Clustering Data*, Prentice Hall, Englewood Cliffs, N.J. 07632, 1988, which is incorporated by reference herein.

For the embodiment in which dimension reduction is combined with clustering, benchmark data for classification, described in R. Agrawal, S. Ghosh, T. Imielinski, B. Iyer, and A. Swami, *An Interval Classifier for Database Mining Applications*, Proceedings of the 18th VLBD Conference, Vancouver, Canada, 1992, pp. 560–573, which is incorporated by reference herein, was modified slightly for clustering purposes, because the benchmark data was not appropriate for testing clustering. Then, the dimension reduction technique described above was applied to the synthetic dataset before clustering, which successfully eliminated irrelevant dimensions and detected two principal dimensions that contributed to the formation of clusters.

The combination of dimension reduction with a clustering technique demonstrates successful dimension reduction, which was found to improve the quality of clustering as well as performance in the clustering phase since clustering is done in the significantly reduced number of dimensions.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for dimension reduction using association rules for large data mining applications. The dimension reduction is applied to general data mining applications without the help of domain experts because it does not require domain knowledge often held only by experts who know the data domain very well. Moreover, the dimension reduction of the present invention is very simple and can be applied to large datasets with low complexity with an efficient association technique.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method of optimizing data mining in a computer, the data mining being performed by the computer to retrieve data from a data store stored on a data storage device coupled to the computer, the data store having records that have multiple attributes, the method comprising the steps of:

clustering the attributes to produce sets of attributes, wherein each set has one or more attributes and wherein attributes that have similar correlations with other attributes are grouped into one set of attributes, resulting in non-intersecting sets of attributes; and for each non-intersecting set of attributes,
   determining attribute value associations between attributes and their values;
   determining attribute associations from the determined attribute value associations by determining a support value for each attribute value association and determining a cumulative support for each attribute in each attribute value association based on the support values for each attribute value association; and
   selecting attributes based on the determined attribute associations for performing data mining.

2. The method of claim 1 above, wherein the step of determining attribute associations further comprises the step of integrating attribute value associations over a value of multiple attributes.

3. The method of claim 2 above, wherein the step of integrating further comprises the step of integrating attribute value associations that have high support.

4. The method of claim 1 above, wherein the step of selecting attributes further comprises the step of selecting attributes until a cut-off point is reached.

5. The method of claim 1 above, further comprising the step of clustering data from the data store using the selected attributes.

6. The method of claim 1 above, further comprising the step of producing a correlation matrix comprising correlation measures between sets of attributes.

7. An apparatus for optimizing data mining, comprising:

a computer having a memory and a data storage device coupled thereto, wherein the data storage device stores a data store, the data store having records that have multiple attributes;

one or more computer programs, performed by the computer, for clustering the attributes to produce sets of attributes, wherein each set has one or more attributes and wherein attributes that have similar correlations with other attributes are ground into one set of attributes, resulting in non-intersecting sets of attributes and for each non-intersecting set of attributes, determining attribute value associations between attributes and their values, determining attribute associations from the determined attribute value associations by determining a support value for each attribute value association and determining a cumulative support for each attribute in each attribute value association based on the support values for each attribute value association, and selecting attributes based on the determined attribute associations for performing data mining.

8. The apparatus of claim 7 above, wherein the means for determining attribute associations further comprises the means for integrating attribute value associations over a value of multiple attributes.

9. The apparatus of claim 8 above, wherein the means for integrating further comprises the means for integrating attribute value associations that have high support.

10. The apparatus of claim 7 above, wherein the means for selecting attributes further comprises the means for selecting attributes until a cut-off point is reached.

11. The apparatus of claim 7 above, further comprising means for clustering data from the data store using the selected attributes.

12. The apparatus of claim 7 above, further comprising means for producing a correlation matrix comprising correlation measures between sets of attributes.

13. An article of manufacture comprising a program storage medium readable by a computer and embodying one or more instructions executable by the computer to perform method steps for optimizing data mining, the data mining being performed by the computer to retrieve data from a data store stored on a data storage device coupled to the computer, the data store having records that have multiple attributes, the method comprising the steps of:

clustering the attributes to produce sets of attributes, wherein each set has one or more attributes and wherein attributes that have similar correlations with other attributes are grouped into one set of attributes, resulting in non-intersecting sets of attributes; and for each non-intersecting set of attributes, determining attribute value associations between attributes and their values;

determining attribute associations from the determined attribute value associations by determining a support value for each attribute value association and determining a cumulative support for each attribute in each attribute value association based on the support values for each attribute value association; and selecting attributes based on the determined attribute associations for performing data mining.

14. The article of manufacture of claim 13 above, wherein the step of determining attribute associations further comprises the step of integrating attribute value associations over a value of multiple attributes.

15. The article of manufacture of claim 14 above, wherein the step of integrating further comprises the step of integrating attribute value associations that have high support.

16. The article of manufacture of claim 13 above, wherein the step of selecting attributes further comprises the step of selecting attributes until a cut-off point is reached.

17. The article of manufacture of claim 13 above, further comprising clustering data from the data store using the selected attributes.

18. The article of manufacture of claim 13 above, further comprising the step of producing a correlation matrix comprising correlation measures between sets of attributes.

* * * * *

UNITED STATES PATENT AND TRADEMARK OFFICE
CERTIFICATE OF CORRECTION

PATENT NO.    : 6,134,555
DATED         : October 17, 2000
INVENTOR(S)   : Atul Chadha, Balakrishna Raghavendra Iyer, Hammou Messatfa, and Jeonghee Yi It is certified that error appears in the above-identified patent and that said Letters Patent is hereby corrected as shown below:

Column 8,
Line 62, please delete "ground" and insert -- grouped --

Signed and Sealed this

Sixth Day of November, 2001

Attest:

*Attesting Officer*

NICHOLAS P. GODICI
*Acting Director of the United States Patent and Trademark Office*